United States Patent
Fukano et al.

(10) Patent No.: US 11,026,366 B2
(45) Date of Patent: Jun. 8, 2021

(54) POWER EQUIPMENT

(71) Applicant: HONDA MOTOR CO., LTD., Tokyo (JP)

(72) Inventors: Jun Fukano, Wako (JP); Masato Takeda, Wako (JP); Keisuke Muraoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 16/342,483

(22) PCT Filed: Nov. 16, 2017

(86) PCT No.: PCT/JP2017/041322
§ 371 (c)(1),
(2) Date: Apr. 16, 2019

(87) PCT Pub. No.: WO2018/097034
PCT Pub. Date: May 31, 2018

(65) Prior Publication Data
US 2019/0269068 A1 Sep. 5, 2019

(30) Foreign Application Priority Data

Nov. 25, 2016 (JP) .............................. JP2016-229548

(51) Int. Cl.
*A01D 34/69* (2006.01)
*A01D 34/00* (2006.01)
(Continued)

(52) U.S. Cl.
CPC ............ *A01D 34/006* (2013.01); *A01B 33/02* (2013.01); *A01D 34/67* (2013.01); *A01D 34/68* (2013.01);
(Continued)

(58) Field of Classification Search
CPC .. A01D 34/006; A01D 34/008; A01D 34/828; A01D 34/86; A01D 34/69;
(Continued)

(56) References Cited

U.S. PATENT DOCUMENTS

| 4,991,382 A | 2/1991 | Scag |
| 5,944,132 A * | 8/1999 | Davies ................... A63B 57/00 180/168 |

(Continued)

FOREIGN PATENT DOCUMENTS

| JP | S61257114 A | 11/1986 |
| JP | H04210514 A | 7/1992 |

(Continued)

OTHER PUBLICATIONS

English translation of International Search Report for International Application No. PCT/JP2017/041322, dated Feb. 20, 2018, 2 pages.
(Continued)

*Primary Examiner* — Thomas B Will
*Assistant Examiner* — Madeline Ivy Runco
(74) *Attorney, Agent, or Firm* — Armstrong Teasdale LLP (57) ABSTRACT

Walk-behind power equipment includes: a main body provided with at least one front wheel and left and right rear wheels and a work unit; travel motors provided for the respective rear wheels; a handle extending from the main body rearward and upward; at least one of a tilt angle detector that detects a tilt angle of the main body and a load detector that detects a downward load applied to the handle; a yaw rate detector that detects a yaw rate; and a control unit that drive-controls the travel motors. The control unit determines whether the main body is in a rearward tilted state based on the tilt angle or the downward load, and if it is determined that the main body is not in the rearward tilted state, performs straight-line travel control to set a rotational speed difference between the travel motors to reduce the yaw rate.

6 Claims, 6 Drawing Sheets

(51) Int. Cl.
*A01D 34/78* (2006.01)
*A01D 69/02* (2006.01)
*G05D 1/02* (2020.01)
*E01H 5/04* (2006.01)
*A01B 33/02* (2006.01)
*B62D 51/06* (2006.01)
*A01D 34/67* (2006.01)
*A01D 34/68* (2006.01)
*A01D 101/00* (2006.01)

(52) U.S. Cl.
CPC ............. *A01D 34/69* (2013.01); *A01D 34/78* (2013.01); *A01D 69/02* (2013.01); *B62D 51/06* (2013.01); *E01H 5/04* (2013.01); *G05D 1/021* (2013.01); *A01D 2101/00* (2013.01); *G05D 2201/0208* (2013.01)

(58) Field of Classification Search
CPC ........ A01D 34/68; A01D 34/67; A01D 34/46; A01D 2034/6825; A01D 34/6806; A01D 75/28; A01D 69/02; A01D 2101/00; A01B 33/02; A01B 33/028; B62D 51/06; B62D 11/04; E01H 5/04
See application file for complete search history.

(56) References Cited

U.S. PATENT DOCUMENTS

| | | | | |
|---|---|---|---|---|
| 6,422,333 B1* | 7/2002 | Kjær | ................... | B60K 28/16 180/197 |
| 6,643,959 B2* | 11/2003 | Jolliff | ................... | B62D 51/06 172/133 |
| 7,146,787 B2* | 12/2006 | Walker | ................... | A01B 51/02 56/15.8 |
| 8,653,786 B2* | 2/2014 | Baetica | ................... | A01D 34/37 320/104 |
| 8,978,796 B2* | 3/2015 | Gallazzini | ............. | B62D 11/04 180/53.7 |
| 2004/0134175 A1* | 7/2004 | Osborne | ............... | A01D 34/006 56/10.6 |
| 2011/0239611 A1 | 10/2011 | Maruyama et al. | | |
| 2012/0159916 A1* | 6/2012 | Ishii | ........................ | B60L 58/40 56/10.2 A |
| 2012/0323420 A1* | 12/2012 | Koike | ..................... | B62D 6/04 701/22 |
| 2013/0025957 A1* | 1/2013 | Ellsworth | ............. | A01D 34/64 180/210 |
| 2016/0244925 A1* | 8/2016 | Yuki | ....................... | E01H 5/045 |
| 2016/0282870 A1* | 9/2016 | Yamamura | ........... | G05D 1/0274 |

FOREIGN PATENT DOCUMENTS

| | | |
|---|---|---|
| JP | 2006207738 A | 8/2006 |
| JP | 2011206018 A | 10/2011 |
| JP | 2012179960 A | 9/2012 |
| JP | 2013123392 A | 6/2013 |
| JP | 2015024011 A | 2/2015 |
| JP | 2016010558 A | 1/2016 |
| WO | 2010019770 A2 | 2/2010 |

OTHER PUBLICATIONS

EPO Extended European Search Report for Application No. 17873325.9 dated May 13, 2020; 7 pp.

* cited by examiner

POWER EQUIPMENT

CROSS-REFERENCE TO RELATED APPLICATIONS

This application is a U.S. National Phase Application of PCT/JP2017/041322, filed Nov. 16, 2017, which claims the benefit of priority to JP Application No. 2016229548, filed Nov. 25, 2016, the contents of which are hereby expressly incorporated by reference in their entirety.

TECHNICAL FIELD

The present invention relates to walk-behind power equipment, such as lawn mowers, grass cutters, snow blowers, tillers, etc.

BACKGROUND ART

A walk-behind lawn mower including a main body provided with a pair of left and right front wheels and a pair of left and right rear wheels, a blade provided in a lower part of the main body, a drive source that drives the blade and the rear wheels, and a handle extending rearward and upward from the main body is known (for example, Patent Document 1).

PRIOR ART DOCUMENT(S)

Patent Document(s)

Patent Document 1: JP2011-206018A

SUMMARY OF THE INVENTION

Task to Be Accomplished By the Invention

In a lawn mowing operation using the aforementioned lawn mower, the operator moves the lawn mower straight forward to mow the lawn in a straight line with a predetermined mowing width, and causes the lawn mower to turn 180 degrees at an end of the field to mow the lawn in a straight line in the opposite direction, and this operation is repeated. Therefore, if the straight-line stability of the lawn mower is poor, the aesthetics of the lawn after the lawn mowing can be reduced, and in addition, it becomes necessary to increase the amount of overlap of the travel paths in order to prevent unmowed lawn from being left between the travel paths, and this reduces the work efficiency. Thus, it is required for the operator to fine-adjust the traveling direction of the lawn mower by pushing and pulling the handle of the lawn mower to maintain the straight-line stability of the lawn mower. Further, when turning, it is required for the operator to control the direction and position of the lawn mower accurately such that an edge of the next swath overlaps with an edge of the previous swath, and the next travel path is in parallel with the previous travel path. These operations of the lawn mower are affected by the skill of the operator, and therefore, there is a demand for a lawn mower that can be operated easily and efficiently even by an inexperienced person.

In view of the above background, an object of the present invention is to provide walk-behind power equipment that is easy to operate.

Means to Accomplish the Task

To achieve the above object, one embodiment of the present invention provides walk-behind power equipment, comprising: a main body provided with at least one front wheel and a pair of left and right rear wheels; a work unit provided on the main body; a pair of left and right travel motors provided for the respective rear wheels; a handle connected to the main body and extending rearward and upward; at least one of a tilt angle detection means that detects a tilt angle of the main body and a downward load detection means that detects a downward load applied to the handle; a yaw rate detection means that detects a yaw rate generated on the main body; and a control unit that drive-controls the travel motors, wherein the control unit determines whether the main body is in a rearward tilted state based on the tilt angle or the downward load, and if it is determined that the main body is not in the rearward tilted state, the control unit performs straight-line travel control to set a rotational speed difference between the left and right travel motors to reduce the yaw rate, and if it is determined that the main body is in the rearward tilted state, the control unit does not perform the straight-line travel control.

According to this arrangement, when the main body is not in the rearward tilted state, the straight-line travel control based on the yaw rate is performed, whereby the power equipment moves straight forward. On the other hand, when the main body is in the rearward tilted state, namely, when it is determined that the front wheels are lifted by the operator to turn the main body, the straight-line travel control is not performed, and therefore, the straight-line travel control does not hinder the turning operation by the operator.

Further, in the above arrangement, preferably, the power equipment further comprises a lateral load detection means that detects a leftward or rightward lateral load applied to the handle, wherein when it is determined that the main body is in the rearward tilted state, the control unit determines a turning direction of the main body based on a direction of the lateral load, and performs turn assist control to set a rotational speed difference between the left and right travel motors such that a rotational speed of the travel motor on a turning direction side is lower than a rotational speed of the other travel motor to assist turning in the turning direction.

According to this arrangement, when the main body is in the rearward tilted state, namely, when it is determined that the front wheels are lifted by the operator to turn the main body, the rear wheels are driven in a direction to assist the turning operation by the operator, and therefore, the turning operation by the operator becomes easy.

Further, in the above arrangement, preferably, when it is determined that the main body is in the rearward tilted state, the control unit determines a turning direction of the main body based on a direction of the yaw rate, and performs turn assist control to set a rotational speed difference between the left and right travel motors such that a rotational speed of the travel motor on a turning direction side is lower than a rotational speed of the other travel motor to assist turning in the turning direction.

According to this arrangement, when the main body is in the rearward tilted state, namely, when it is determined that the front wheels are lifted by the operator to turn the main body, the rear wheels are driven in a direction to assist the turning operation by the operator, and therefore, the turning operation by the operator becomes easy.

Further, in the above arrangement, preferably, in the turn assist control, the control unit drive-controls the travel motor such that the main body turns 180 degrees.

According to this arrangement, it becomes easy for the operator to turn the main body 180 degrees.

Further, in the above arrangement, preferably, the work unit includes a lawn mowing blade rotated by the work motor, and in the turn assist control, the control unit drive-controls the left and right travel motors such that the main body turns 180 degrees and an amount of lateral displacement of the main body between before and after the turning is less than or equal to a mowing width of the blade. Also preferably, the work unit includes a tiller blade rotated by the work motor, and in the turn assist control, the control unit drive-controls the left and right travel motors such that the main body turns 180 degrees and an amount of lateral displacement of the main body between before and after the turning is greater than or equal to a lateral width of the tiller blade.

According to this arrangement, it becomes easy for the operator to turn the main body 180 degrees and to adjust the lateral position of the main body after the turning.

Effect of the Invention

According to the foregoing arrangement, it is possible to provide walk-behind power equipment that is easy to operate.

MODES FOR CARRYING OUT THE INVENTION

In the following, an embodiment in which power equipment according to the present invention is applied to a walk-behind electric lawn mower will be described with reference to FIGS. 1 to 6.

(Outline of Structure of Electric Lawn Mower)

Figure 1:
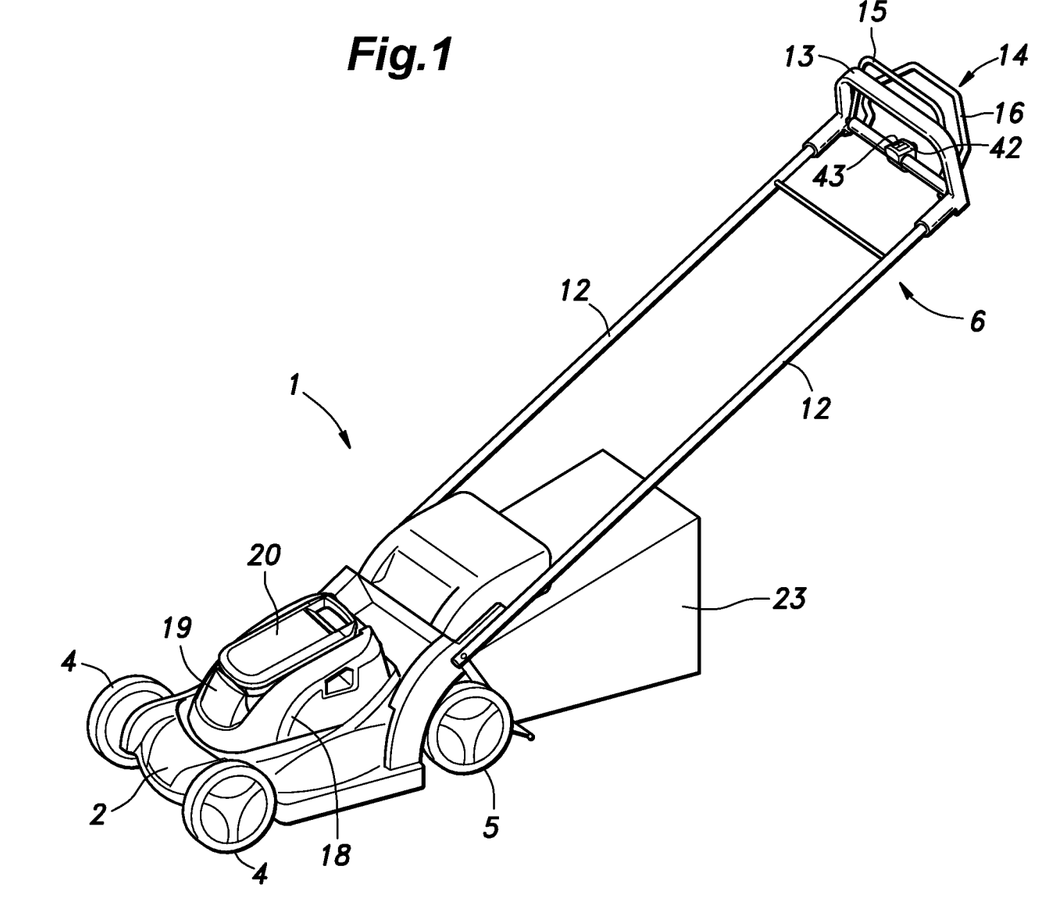
FIG. 1 is a perspective view of an electric lawn mower according to an embodiment.
Figure 2:
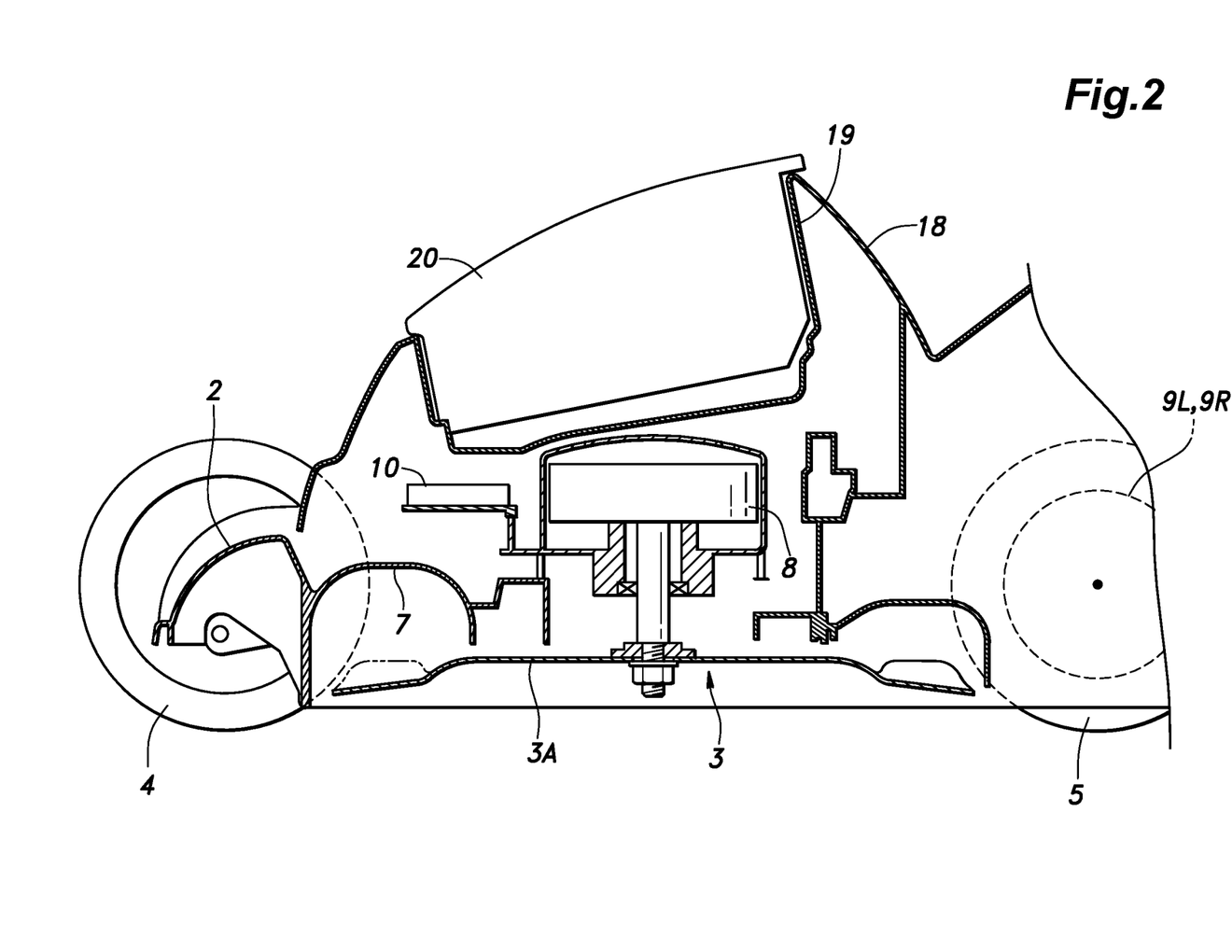
FIG. 2 is a sectional view of the electric lawn mower according to the embodiment.

As shown in FIGS. 1 and 2, an electric lawn mower 1 according to the present embodiment includes a main body 2, a work unit 3 provided in a lower part of the main body 2, a pair of left and right front wheels 4 and a pair of left and right rear wheels 5 rotatably supported on the main body 2, and a handle 6 extending rearward and upward from the main body 2. The work unit 3 is provided with a recess 7 that opens out downward at the center of the lower part of the main body 2 and a blade 3A that is rotatably disposed in the recess 7 and serves as a lawn mowing blade. Supported on the main body 2 are a work motor 8 having a rotation output shaft coupled to the blade 3A and a pair of left and right travel motors 9L and 9R for driving the left and right rear wheels 5, respectively. The work motor 8 and the travel motors 9L and 9R are electric motors, and the main body 2 is provided with a control unit 10 for controlling the motors 8, 9L and 9R.

The handle 6 includes a pair of side bars 12 extending upward and rearward from either side of a rear part of the main body 2 and a frame-shaped grip 13 connecting the rear ends of the side bars 12 to each other. The grip 13 of the handle 6 is provided with an operation input unit 14 for receiving an input operation by an operator. The operation input unit 14 is provided with a travel lever 15 for operating the travel motors 9L and 9R and a work lever 16 for operating the work motor 8.

The upper part of the main body 2 is provided with an upper cover 18 that covers the work motor 8, the left and right travel motors 9L and 9R, and the control unit 10. A battery 20 for supplying electric power to the motors 8 and 9 and the control unit 10 is detachably received in a battery tray 19 formed by recessing the upper surface of the upper cover 18.

The main body 2 is formed with a passage (not shown) extending from the recess 7 to the rear side of the main body 2, and a grass bag 23 is provided to close an open end of the passage. The grass cut by the blade 3A is discharged from the recess 7 to the rear through the passage, and collected in the grass bag 23.

(Control Unit)

Figure 3:
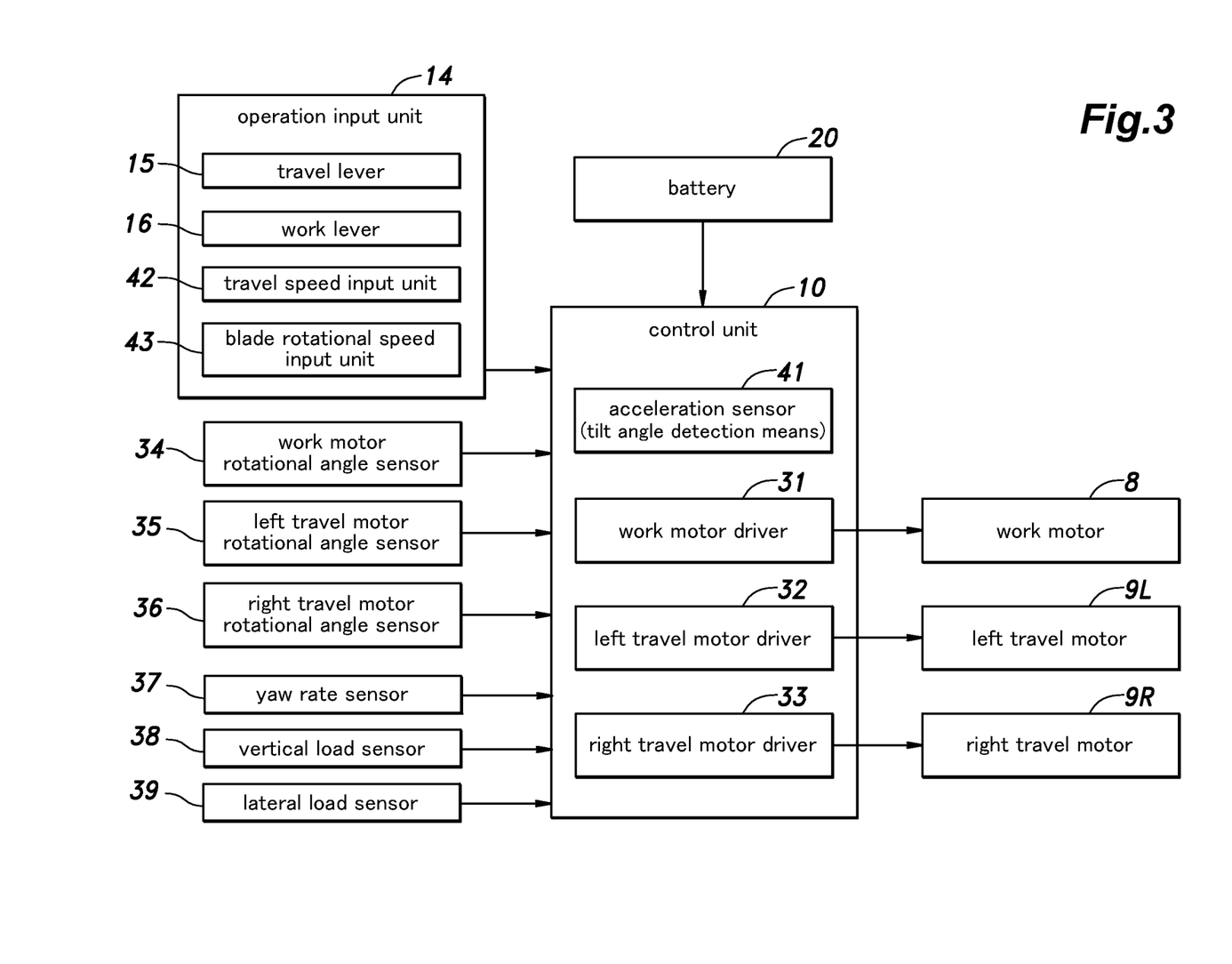
FIG. 3 is a block diagram showing a structure of a control unit.

The control unit 10 consists of an electronic control circuit (ECU) constituted of a microcomputer, ROM, RAM, a peripheral circuit, an input/output interface, drivers and the like. As shown in FIG. 3, the control unit 10 is connected to the battery 20 and receives power supply from the battery 20. The control unit 10 is provided with motor drivers 31, 32 and 33 corresponding to the work motor 8 and the left and right travel motors 9L and 9R, respectively. The control unit 10 causes the electric power to be supplied from the battery 20 to the motors 8, 9L and 9R via the motor drivers 31 to 33, and controls the motors 8, 9L and 9R. For instance, the control unit 10 changes the electric voltages provided to the motors 8, 9L and 9R by controlling the respective motor drivers 31, 32 and 33 according to PWM control, to thereby changes the rotational speeds of the motors 8, 9L and 9R.

The work motor 8 and the left and right travel motors 9L and 9R are provided with respective rotational angle sensors 34, 35 and 36 for detecting the rotational angles of the corresponding motors 8, 9L and 9R. The rotational angle sensors 34, 35 and 36 output signals corresponding to the rotational angles of the respective motors 8, 9L and 9R to the control unit 10, and the control unit 10 acquires the rotational speeds of the work motor 8 and the left and right travel motors 9L and 9R according to the signals.

The main body 2 is provided with a yaw rate sensor 37 (yaw rate detection means) that detects a yaw rate generated on the main body 2. The yaw rate is the angular velocity of rotation of the main body 2 about an axis (Z axis) passing through the center of gravity of the main body 2 and extending vertically. The yaw rate sensor 37 outputs a signal corresponding to the yaw rate generated on the main body 2 to the control unit 10, and the control unit 10 acquires the value of the yaw rate corresponding to the signal. The yaw rate sensor 37 is set such that a yaw rate for clockwise rotation in plan view is represented by a positive value and a yaw rate for counter-clockwise rotation is represented by a negative value.

The main body 2 is provided with a vertical load sensor 38 (downward load detection means) that detects a vertical load applied to the handle 6 and a lateral load sensor 39 (lateral load detection means) that detects a lateral load applied to the handle 6. The vertical load sensor 38 and the lateral load sensor 39 each may be a known strain gauge. The handle 6 is joined to the main body 2 so as to be movable slightly, and the vertical load sensor 38 and the lateral load sensor 39 are interposed between the main body 2 and a front end of the side bar 12 of the handle 6. The vertical load sensor 38 and the lateral load sensor 39 each outputs a signal corresponding to the applied load to the control unit 10, and the control unit 10 acquires the value of the load corresponding to the signal. The vertical load sensor 38 is set such that a downward load is represented by a positive value and an upward load is represented by a negative value. The lateral load sensor 39 is set such that a rightward load is represented by a positive value and a leftward load is represented by a negative value.

The control unit 10 includes an acceleration sensor 41 serving as a tilt angle detection means. For instance, the acceleration sensor 41 is a semiconductor device formed on the board of the control unit 10, and is preferably formed using MEMS technology. The acceleration sensor 41 may be an acceleration sensor of capacitance type, piezoelectric type or the like. The acceleration sensor 41 is a 3-axis acceleration sensor that outputs signals corresponding to accelerations of the main body 2 in the fore and aft direction (X axis), the lateral direction (Y axis), and the vertical direction (Z axis). The signals output from the acceleration sensor 41 includes a low-frequency static component (DC acceleration) attributed to gravity acceleration and a high-frequency dynamic component (AC acceleration) attributed to movement of the main body 2.

The control unit 10 detects a posture of the main body 2 based on the signal from at least one of the acceleration sensor 41 and the vertical load sensor 38. Each of the acceleration sensor 41 and the vertical load sensor 38 constitutes a posture detection means.

The travel lever 15 and the work lever 16 are each pivotally attached to the handle 6 such that the grip of each lever is movable between an initial position where the grip is spaced from the grip 13 of the handle 6 and an operation position where the grip is located close to the grip 13 of the handle 6. The operation input unit 14 outputs a travel command signal corresponding to the position of the travel lever 15 to the control unit 10, and outputs a blade rotation command signal corresponding to the position of the work lever 16 to the control unit 10. The travel command signal has a value corresponding to 0% when the travel lever 15 is in the initial position and a value corresponding to 100% when the travel lever 15 is in the operation position, where the value of the travel command signal increases gradually from the initial position to the operation position. Similarly, the blade rotation command signal is a value corresponding to 0% when the work lever 16 is in the initial position and a value corresponding to 100% when the work lever 16 is in the operation position, where the value of the blade rotation command signal increases gradually from the initial position to the operation position. In lawn mowing operation, the operator grasp the grips of the travel lever 15 and the work lever 16 together with the grip 13 of the handle 6 to place the travel lever 15 and the work lever 16 in the operation position.

The operation input unit 14 is provided with a travel speed input unit 42 for accepting an input operation by an operator regarding the travel speed of the electric lawn mower 1. The travel speed input unit 42 may consist of a lever, a dial, or the like that can be displaced with respect to the main body of the operation input unit 14, and the operation input unit 14 outputs a signal corresponding to the position of the travel speed input unit 42 to the control unit 10. Based on the signal from the operation input unit 14, the control unit 10 acquires a commanded rotational speed of the travel motors 9L and 9R corresponding to the travel speed desired by the operator.

The operation input unit 14 is provided with a blade rotational speed input unit 43 for accepting an input operation by the operator regarding the rotational speed of the blade 3A. The blade rotational speed input unit 43 may consist of a lever, a dial, a push button, or the like that can be displaced with respect to the main body of the operation input unit 14, and the operation input unit 14 outputs a signal corresponding to the position of the blade rotational speed input unit 43 to the control unit 10. Based on the signal from the operation input unit 14, the control unit 10 acquires a commanded rotational speed of the work motor 8 corresponding to the blade rotational speed desired by the operator.

Figure 5:
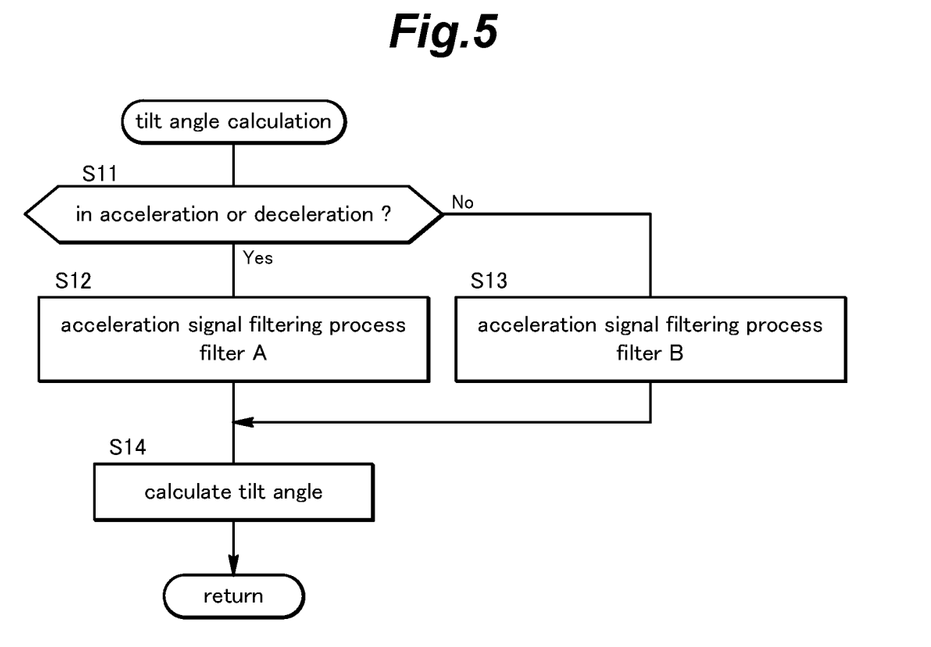
FIG. 5 is a flowchart showing a procedure of tilt angle calculation.
Figure 6:
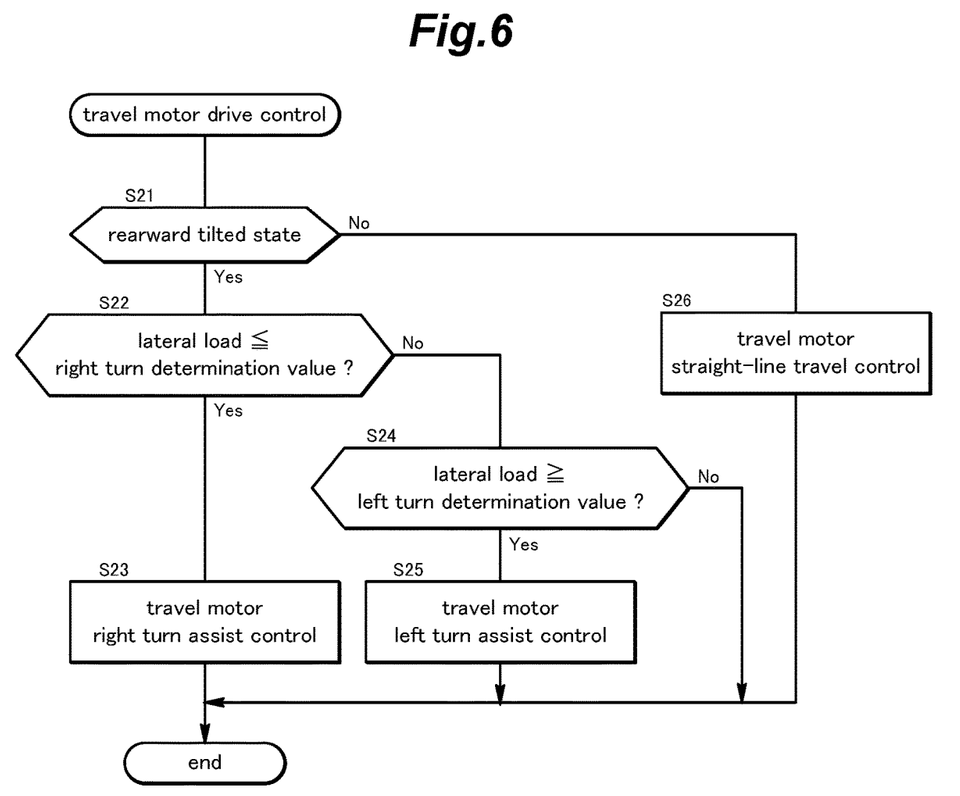
FIG. 6 is a flowchart showing a procedure of travel motor drive control.

Next, with reference to FIGS. 4 to 6, description will be made of the control performed by the control unit 10. The control unit 10 performs drive control shown in FIG. 4 and tilt angle calculation control shown in FIG. 5 in parallel. The travel motor drive control shown in FIG. 5 shows details of step S5 of the drive control shown in FIG. 4.

Figure 4:
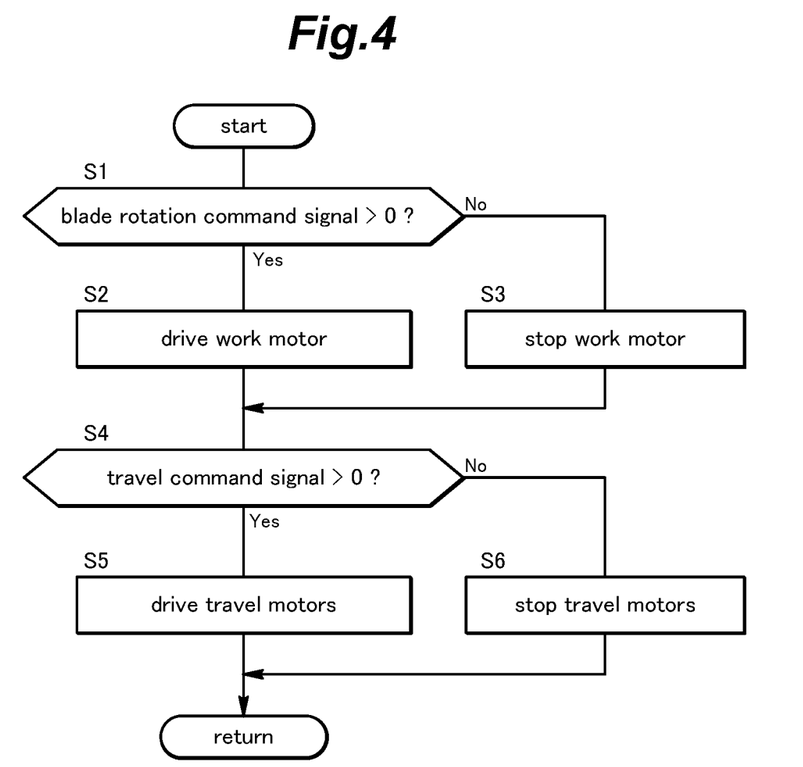
FIG. 4 is a flowchart showing a procedure of drive control.

In the drive control shown in FIG. 4, the control unit 10 first determines whether the value of the blade rotation command signal Kb is greater than 0% (step S1). If the value of the blade rotation command signal is greater than 0% (the blade rotation command signal is ON), the control unit 10 drive-controls the work motor 8 in step S2. A target rotational speed $Rb\_t$ of the work motor 8 is calculated by multiplying the commanded rotational speed $Rb\_r$ of the work motor 8 by the value of the blade rotation command signal Kb ($Rb\_t=Rb\_r \times Kb$). At this time, the control unit 10 performs feedback control based on the signal from the work motor rotational angle sensor 34 such that the rotational speed of the work motor 8 coincides with the target rotational speed $Rb\_t$.

If it is determined in step S1 that the value of the blade rotation command signal is 0% (the blade rotation command signal is OFF), the control unit 10 proceeds to step S3 and stops the work motor 8.

In step S4 that follows step S2 or S3, the control unit 10 determines whether the value of the travel command signal is greater than 0%. If the value of the travel command signal is greater than 0% (the travel command signal is ON), the control unit 10 drive-controls the travel motors 9L and 9R in step S5. The drive control of the travel motors 9L and 9R in step S5 will be described in detail later.

If it is determined in step S4 that the value of the travel command signal is 0% (the travel command signal is OFF), the control unit 10 proceeds to step S6 and stops the travel motors 9L and 9R. After performing the process in step S7 or S8, the control unit 10 proceeds to the return step, and repeats the drive control.

Next, the tilt angle calculation performed by the control unit 10 will be described. In the tilt angle calculation shown in FIG. 5, the control unit 10 first determines whether or not the travel motors 9L and 9R are in acceleration or deceleration (step S11). In the present embodiment, the control unit 10 performs the determination in step S11 based on the value of the travel command signal. Specifically, the control unit 10 determines whether it is in a predetermined period from detection of an increase or decrease of the value of the travel command signal. In the aforementioned step S5, the rotational speed of the travel motors 9L and 9R is controlled based on the value of the travel command signal, and therefore, it can be determined that the travel motors 9L and 9R are in acceleration or deceleration during the predetermined period from an increase or decrease of the value of the travel command signal.

If it is determined in step S11 that the main body 2 is in acceleration or deceleration (Yes), the control unit 10 performs a low-pass filtering process on the signal from the acceleration sensor 41 by use of a low-pass filter A in step S12, and if it is determined in step S11 that the main body 2 is not in acceleration or deceleration (No), the control unit 10 performs a low-pass filtering process on the signal from the acceleration sensor 41 by use of a low-pass filter B in step S13. The control unit 10 may perform a moving average process the signal from the acceleration sensor 41 before or after the low-pass filtering process in steps S12 and S13. Owing to the low-pass filtering process in steps S12 and S13, a part of the dynamic component of the acceleration, which is a high-frequency component, is removed from the signal from the acceleration sensor 41, so that the static component attributed to gravity is extracted. The low-pass filter A used in step S12 is designed to have a cutoff frequency lower than that of the low-pass filter B used in step S12, and hence has a higher removal ratio of the high-frequency component. Namely, by use of the low-pass filter A, the removal ratio of the dynamic component corresponding to the high-frequency component in the signal from the acceleration sensor 41 is increased compared to the case where the low-pass filter B is used, whereby the dynamic component of the acceleration attributed to travel of the main body 2 is removed even more reliably.

In step S14 that follows steps S12 and S13, based on the signal from the acceleration sensor 41 that has been subjected to the low-pass filtering process to extract the static component of the acceleration, the control unit 10 calculates a tilt angle of the main body 2 about the lateral axis (Y axis) with respect to a horizontal plane (pitch angle). For instance, the calculation of the tilt angle may be preferably performed by multiplying the value of the signal of the acceleration sensor 41 by a predetermined coefficient based on a relationship between the value of the signal of the acceleration sensor 41 and the tilt angle that has been confirmed beforehand. After performing the process in step S14, the control unit 10 proceeds to the return step and repeats the tilt angle calculation control.

Next, the travel motor drive control in step S5 of the drive control shown in FIG. 4 will be described with reference to FIG. 6. In the travel motor drive control, the control unit 10 determines in first step S21 whether the main body 2 is in a predetermined rearward tilted state. In contrast to a reference state in which all the front wheels 4 and the rear wheels 5 are in contact with the ground, the rearward tilted state of the main body 2 is a state in which the main body 2 has been pivoted about the axis of the left and right rear wheels 5 such that the left and right front wheels 4 are spaced from the ground while the left and right rear wheels 5 are in contact with the ground. With the operator pushing down the handle 6 when the main body 2 is in the reference state, the main body 2 is pivoted about the axis of the rear wheels 5 into the rearward tilted state.

Whether the main body 2 is in the predetermined rearward tilted state can be determined in various ways. For example, it can be determined by any of the following four methods. In the first method, it may be determined that the main body 2 is in the predetermined rearward tilted state if the absolute value of the tilt angle calculated by the tilt angle calculation is greater than or equal to a predetermined tilt angle determination value.

In the second method, it may be determined that the main body 2 is in the predetermined rearward tilted state if the absolute value of the tilt angle calculated by the tilt angle calculation is greater than or equal to the predetermined tilt angle determination value and the change rate of the tilt angle is greater than or equal to a predetermined change rate determination value. By taking into account the change rate of the tilt angle of the main body 2, it is possible to determine what caused the predetermined tilt angle. For example, in a case where the operator pushed down the handle 6, the change rate of the tilt angle is relatively large, while in such a case as when the tilt angle of the main body 2 changes gradually as a result of operation on slopes, the change rate of the tilt angle is relatively small, and therefore, they can be distinguished from each other.

In the third method, it may be determined that the main body 2 is in the predetermined rearward tilted state if the vertical load detected by the vertical load sensor 38 is greater than or equal to a predetermined vertical load determination value. By performing the determination based on the vertical load, it is possible to determine that an operation of pushing down the grip 13 of the handle 6 is performed by the operator, and to determine that the rearward tilted state is caused by the push-down operation.

In the fourth method, it may be determined that the main body 2 is in the predetermined rearward tilted state if the vertical load detected by the vertical load sensor 38 is greater than or equal to the predetermined vertical load determination value and the absolute value of the tilt angle is greater than or equal to the predetermined tilt angle determination value. By performing the determination based on the vertical load and the tilt angle, it is possible to determine whether the main body 2 is in the rearward tilted state even more reliably.

If it is determined in step S21 that the main body 2 is in the rearward tilted state, the control unit 10 proceeds to step S22, and performs turn assist control which is realized by the processes in steps S22-S25. On the other hand, if it is determined in step S21 that the main body 2 is not in the rearward tilted state, the control unit 10 performs straight-line travel control in step S26.

In the turn assist control, it is determined in step S22 whether the lateral load detected by the lateral load sensor 39 is less than or equal to a predetermined right turn determination value. The lateral load has a positive value when it is a rightward load and has a negative value when it is a leftward load. The right turn determination value is a negative value, and is set to determine whether the lateral load is a leftward load, namely, whether a predetermined leftward load is applied to the handle 6. Application of a leftward load to the handle 6 causes the main body 2 to yaw rightward, and therefore, when the lateral load is less than or equal to the right turn determination value, it can be determined that the operator is trying to turn the main body 2 rightward or the main body 2 is in a right turning operation.

If it is determined in step S22 that the lateral load is greater than the right turn determination value, the control unit 10 determines in step S24 whether the lateral load is greater than or equal to a predetermined left turn determination value. The left turn determination value is a positive value, and is set to determine whether the lateral load is a rightward load, namely, whether a predetermined rightward load is applied to the handle 6. Application of a rightward load to the handle 6 causes the main body 2 to yaw leftward, and therefore, when the lateral load is greater than or equal to the left turn determination value, it can be determined that the operator is trying to turn the main body 2 leftward or the main body 2 is in a left turning operation.

If the determination result in step S22 is Yes (the lateral load is less than or equal to the right turn determination value), the control unit 10 performs right turn assist control in step S23, if the determination result in step S24 is Yes (the lateral load is greater than or equal to the left turn determination value), the control unit 10 performs left turn assist control in step S25, and if the determination result in step S24 is No (the lateral load is greater than the right turn determination value and less than the left turn determination value), the control unit 10 performs neither of the right turn assist control and the left turn assist control.

In the right turn assist control, the control unit 10 sets the target rotational speed of the left travel motor 9L to be higher than the target rotational speed of the right travel motor 9R, and drives the left and right travel motors 9L and 9R for a predetermined period by controlling the travel motor drivers 32 and 33 based on the respective target rotational speeds. On the other hand, in the left turn assist control, the control unit 10 sets the target rotational speed of the right travel motor 9R to be higher than the target rotational speed of the left travel motor 9L, and drives the left and right travel motors 9L and 9R for a predetermined period by controlling the travel motor drivers 32 and 33 based on the respective target rotational speeds. In the right turn assist control and the left turn assist control, the rotational speed difference between the left and right travel motors 9L and 9R and the driving period of the left and right travel motors 9L and 9R are set such that the main body 2 turns right 180 degrees and the amount of lateral displacement of the main body 2 between before and after the turning is less than or equal to the mowing width of the blade 3A. It is to be note that the closer the amount of lateral displacement of the main body 2 between before and after the turning is to the mowing width, the better because the overlap of the travel paths becomes smaller. In the present embodiment, the mowing width of the blade 3A is determined by the diameter of the blade. The amount of lateral displacement of the main body 2 between before and after the turning is determined by the turning radius of the main body 2. The turning radius of the main body 2 is determined by the rotational speed difference between the left and right travel motors 9L and 9R, and the turning angle of the main body 2 is determined by the rotational speeds and the driving period of the travel motors 9L and 9R.

The target rotational speeds in the right turn assist control are calculated according to the following Equations (1) and (2), for example:

$$Rs\_tr = Rs\_r \times Ks \times Kdr \quad (1)$$

$$Rs\_tl = Rs\_r \times Ks \times Kdl \quad (2)$$

where Rs_tr represents the target rotational speed of the right travel motor 9R, Rs_r represents the commanded rotational speed of the left and right travel motors, Kdr represents a right rotational speed coefficient, Rs_tl represents the target rotational speed of the left travel motor 9L, and Kdl represents a left rotational speed coefficient. The right rotational speed coefficient Kdr and the left rotational speed coefficient Kdl have values predetermined for the right turn assist control and the left turn assist control. In the right turn assist control, the left rotational speed coefficient Kdl is set to a value greater than the right rotational speed coefficient Kdr, and in the left turn assist control, the right rotational speed coefficient Kdr is set to a value greater than the left rotational speed coefficient Kdl. Preferably, a half of the sum of the right rotational speed coefficient Kdr and the left rotational speed coefficient Kdl is equal to 1. In the right turn assist control and the left turn assist control, after driving the left and right travel motors 9L and 9R for a predetermined period with the target rotational speeds having a rotational speed difference, the control unit 10 sets the right rotational speed coefficient Kdr and the left rotational speed coefficient Kdl to 1 to make the rotational speed difference zero.

After performing the right turn assist control or the left turn assist control, the control unit 10 proceeds to end, and terminates the process of step S5 in the drive control of FIG. 1. Further, in the case where the lateral load is greater than the right turn determination value and less than the left turn determination value, the control unit 10 determines that the lawn mower is not in the turning state and proceeds to end without performing the right or left turn assist control.

If it is determined in step S21 that the main body 2 is not in the rearward tilted state, the control unit 10 performs straight-line travel control of the travel motors 9L and 9R. In the straight-line travel control, the control unit 10 sets a rotational speed difference between the target rotational speeds of the left and right travel motors 9L and 9R based on the yaw rate detected by the yaw rate sensor 37, and drives the left and right travel motors 9L and 9R for a predetermined period by controlling the travel motor drivers 32 and 33 based on the respective target rotational speeds. In the straight-line travel control, when a clockwise yaw rate is detected, the rotational speed difference is set such that the target rotational speed of the right travel motor 9R is higher than the target rotational speed of the left travel motor 9L, and when a counter-clockwise yaw rate is detected, the rotational speed difference is set such that the target rotational speed of the left travel motor 9L is higher than the target rotational speed of the right travel motor 9R.

The target rotational speeds in the straight-line travel control are calculated according to the aforementioned Equations (1) and (2), for example. The right rotational speed coefficient Kdr and the left rotational speed coefficient Kdl are set by referring to a map in which the right rotational speed coefficient Kdr and the left rotational speed coefficient Kdl are set with respect to values of the yaw rate. In the map, setting is made such that the right rotational speed coefficient Kdr is greater than the left rotational speed coefficient Kdl for positive values of the yaw rate (right turn), and the difference between the right rotational speed coefficient Kdr and the left rotational speed coefficient Kdl increases as the yaw rate increases. At this time, the left rotational speed coefficient Kdl may unchangingly have a constant value irrespective of the increase in the yaw rate or may decrease with the increase in the yaw rate. In addition, in the map, setting is made such that the left rotational speed coefficient Kdl is greater than the right rotational speed coefficient Kdr for negative values of the yaw rate (left turn), and the difference between the right rotational speed coefficient Kdr and the left rotational speed coefficient Kdl increases as the yaw rate increases. At this time, the right rotational speed coefficient Kdr may unchangingly have a constant value irrespective of the increase in the yaw rate or may decrease with the increase in the yaw rate. If setting is made such that a half of the sum of the right rotational speed coefficient Kdr and the left rotational speed coefficient Kdl is equal to 1, the travel speed of the main body 2 becomes constant. In the straight-line travel control, after driving the left and right travel motors 9L and 9R for a predetermined period with the target rotational speeds having a rotational speed difference, the control unit 10 sets the right rotational speed coefficient Kdr and the left rotational speed coefficient Kdl to 1 to make the rotational speed difference zero. After performing the straight-line travel control, the control unit 10 proceeds to end and terminates the step of step S5 in the drive control of FIG. 1.

With the control unit 10 performing the control flow shown in FIGS. 4 to 6, the electric lawn mower 1 operates as follows. When the work lever 16 is moved to the operation position side or is turned on by the operator, the work motor 8 is driven and the blade 3A is rotated so that the electric lawn mower 1 can perform lawn mowing. When the travel lever 15 is moved to the operation position side or is turned on, the travel motors 9L and 9R are driven and the rear wheels 5 are rotated so that the electric lawn mower 1 can move forward. In normal lawn mowing operation, the operator grasps the grips of the travel lever 15 and the work lever 16 together with the grip 13 of the handle 6 to place the travel lever 15 and the work lever 16 in the operation position.

The control unit 10 determines whether the main body 2 is in a predetermined rearward tilted state, and if it is determined that the main body 2 is not in the rearward tilted state, performs straight-line travel control. In the straight-line travel control, yawing of the main body 2 is detected based on the yaw rate generated on the main body 2, and a rotational speed difference is set between the left and right travel motors 9L and 9R to suppress the yawing. Thereby, when a clockwise yaw rate is detected, the rotational speed of the right travel motor 9R becomes higher than the rotational speed of the left travel motor 9L, and when a counter-clockwise yaw rate is detected, the rotational speed of the left travel motor 9L becomes higher than the rotational speed of the right travel motor 9R, whereby a turning force is applied to the main body 2 in a direction to suppress the yaw rate.

When it is determined that the main body 2 is in the predetermined rearward tilted state, the control unit 10 does not perform the straight-line travel control. Therefore, the turning operation by the operator is not hindered by the straight-line travel control. In addition, when it is determined that the main body 2 is in the predetermined rearward tilted state, the control unit 10 acquires the operator's intention to perform turning operation and the turning direction based on the lateral load applied to the handle 6, and performs the right turn assist control or the left turn assist control. In the left and right turn assist control, a rotational speed difference is provided between the left and right travel motors 9L and 9R, so that the main body 2 makes a turn. At this time, the rotational speed difference between the left and right travel motors 9L and 9R and the duration time of the driving with the rotational speed difference are set appropriately such that the main body 2 turns 180 degrees and the amount of lateral displacement of the main body 2 between before and after the turning is less than or equal to the mowing width of the blade 3A. Thereby, the edges of the swaths between before and after the turning overlap each other, and the lawn is prevented from being left unmowed.

As described in the foregoing, because the electric lawn mower 1 selectively performs the straight-line travel control, the right turn assist control, or the left turn assist control depending on the rearward tilted state of the main body 2 and the lateral load applied to the handle, the operator is allowed to perform the lawn mowing work easily and appropriately without being any special operation needed when moving the mower straight or when turning the mower.

A concrete embodiment of the present invention has been described in the foregoing, but the present invention is not limited to the embodiment and may be modified or altered in various ways. In the foregoing embodiment, configuration was made to perform left and right turn assist control (steps S22-S25), but in another embodiment, the left and right turn assist control (steps S22-S25) may be omitted.

Further, in the foregoing embodiment, configuration was made to left and right turning operations by comparing the lateral load with the right turn determination value and the left turn determination value (steps S22 and S24), but in another embodiment, left and right turning operations may be detected by comparing the yaw rate with a predetermined determination value.

In the foregoing embodiment, the present invention was exemplarily applied to the lawn mower, but the present invention can be similarly applied to a grass cutter, a snow blower, and a tiller. In the case of a grass cutter, the blade 3A should be replaced with a blade suitable for grass cutting, in the case of a snow blower, the blade 3A should be replaced with an auger suitable for snow removal, and in the case of a tiller, the blade 3A should be replaced with a tiller blade suitable for tilling.

For instance, in the case where the work unit 3 is replaced with a tiller blade suitable for tilling, the rotational speed difference between the left and right travel motors 9L and 9R and the duration time of the driving with the rotational speed difference in the left or right turn assist control should be preferably set such that the main body 2 turns 180 degrees and the amount of lateral displacement of the main body 2 between before and after the turning is greater than or equal to the lateral width of the tiller blade.

Glossary

1 electric lawn mower
2 main body
3 work unit
3A blade
4 front wheels
5 rear wheels
8 work motor
9L left travel motor
9R right travel motor
10 control unit
14 operation input unit
15 travel lever
16 work lever
20 battery
31 work motor driver
32 left travel motor driver
33 right travel motor driver
34 work motor rotational angle sensor
35 left travel motor rotational angle sensor
36 right travel motor rotational angle sensor
37 yaw rate sensor
38 vertical load sensor
39 lateral load sensor
41 acceleration sensor
42 travel speed input unit
43 blade rotational speed input unit

The invention claimed is:

1. Walk-behind power equipment, comprising:
   a main body provided with at least one front wheel and a pair of left and right rear wheels;
   a work unit provided on the main body;
   a pair of left and right travel motors provided for the respective rear wheels;
   a handle connected to the main body and extending rearward and upward;
   a tilt angle detector that detects a tilt angle of the main body;
   a yaw rate detector that detects a yaw rate generated on the main body; and a control unit that drive-controls the travel motors,
wherein the control unit determines whether the main body is in a rearward tilted state based on the tilt angle, and if it is determined that the main body is not in the rearward tilted state, the control unit performs straight-line travel control to set a rotational speed difference between the left and right travel motors to reduce the yaw rate, and if it is determined that the main body is in the rearward tilted state, the control unit does not perform the straight-line travel control.

2. The power equipment according to claim 1, further comprising a lateral load detector that detects a leftward or rightward lateral load applied to the handle,
wherein when it is determined that the main body is in the rearward tilted state, the control unit determines a turning direction of the main body based on a direction of the lateral load, and performs turn assist control to set a rotational speed difference between the left and right travel motors such that a rotational speed of the travel motor on a turning direction side is lower than a rotational speed of the other travel motor to assist turning in the turning direction.

3. The power equipment according to claim 1, wherein when it is determined that the main body is in the rearward tilted state, the control unit determines a turning direction of the main body based on a direction of the yaw rate, and performs turn assist control to set a rotational speed difference between the left and right travel motors such that a rotational speed of the travel motor on a turning direction side is lower than a rotational speed of the other travel motor to assist turning in the turning direction.

4. The power equipment according to claim 2 wherein in the turn assist control, the control unit drive-controls the travel motor such that the main body turns 180 degrees.

5. The power equipment according to claim 2, wherein the work unit includes a lawn mowing blade rotated by a work motor, and
in the turn assist control, the control unit drive-controls the left and right travel motors such that the main body turns 180 degrees and an amount of lateral displacement of the main body between before and after the turning is less than or equal to a mowing width of the blade.

6. The power equipment according to claim 2, wherein the work unit includes a tiller blade rotated by a work motor, and
in the turn assist control, the control unit drive-controls the left and right travel motors such that the main body turns 180 degrees and an amount of lateral displacement of the main body between before and after the turning is greater than or equal to a lateral width of the tiller blade.

* * * * *